United States Patent [19]

Dambrine

[11] 4,191,586

[45] Mar. 4, 1980

[54] METHOD AND APPARATUS FOR REDUCING THE CALORIFIC CONSUMPTION OF A CEMENT PRODUCING PLANT

[75] Inventor: Francis Dambrine, Marcq en Baroeul, France

[73] Assignee: Fives-Cail Babcock, Paris, France

[21] Appl. No.: 898,549

[22] Filed: Apr. 21, 1978

Related U.S. Application Data

[63] Continuation-in-part of Ser. No. 735,426, Oct. 26, 1976, abandoned.

[30] Foreign Application Priority Data

Oct. 23, 1975 [FR] France ............................. 75 32484

[51] Int. Cl.² ............................................. C04B 7/40
[52] U.S. Cl. ................................................... 106/100
[58] Field of Search ............... 106/100; 34/72; 432/14; 75/5

[56] References Cited

U.S. PATENT DOCUMENTS

| | | | |
|---|---|---|---|
| 1,828,270 | 10/1931 | Anderson | 106/100 |
| 3,333,951 | 8/1967 | Ban | 75/5 X |
| 3,849,115 | 11/1974 | Ban | 75/5 |
| 4,045,162 | 8/1977 | Christiansen | 106/100 X |
| 4,071,310 | 1/1978 | Ghestem | 106/100 X |
| 4,078,882 | 3/1978 | Houd | 432/14 |

*Primary Examiner*—G. O. Peters
*Attorney, Agent, or Firm*—Kurt Kelman

[57] ABSTRACT

A major portion of raw material converted into clinker in a rotary tubular kiln is preheated by hot gases recovered from the kiln. The clinker is cooled in a cooler to which fresh air is delivered. The fresh air is heated in heat exchange contact with the clinker and fresh air thus heated to a temperature of 900° C. to 1000° C. is removed from the cooler and brought into heat exchange contact with a minor fraction of the raw material, thus at least partially calcining the raw material fraction and simultaneously cooling the air. The at least partially calcined raw material fraction is introduced into the kiln and at least a portion of the cooled air is delivered with the fresh air to the clinker.

3 Claims, 1 Drawing Figure

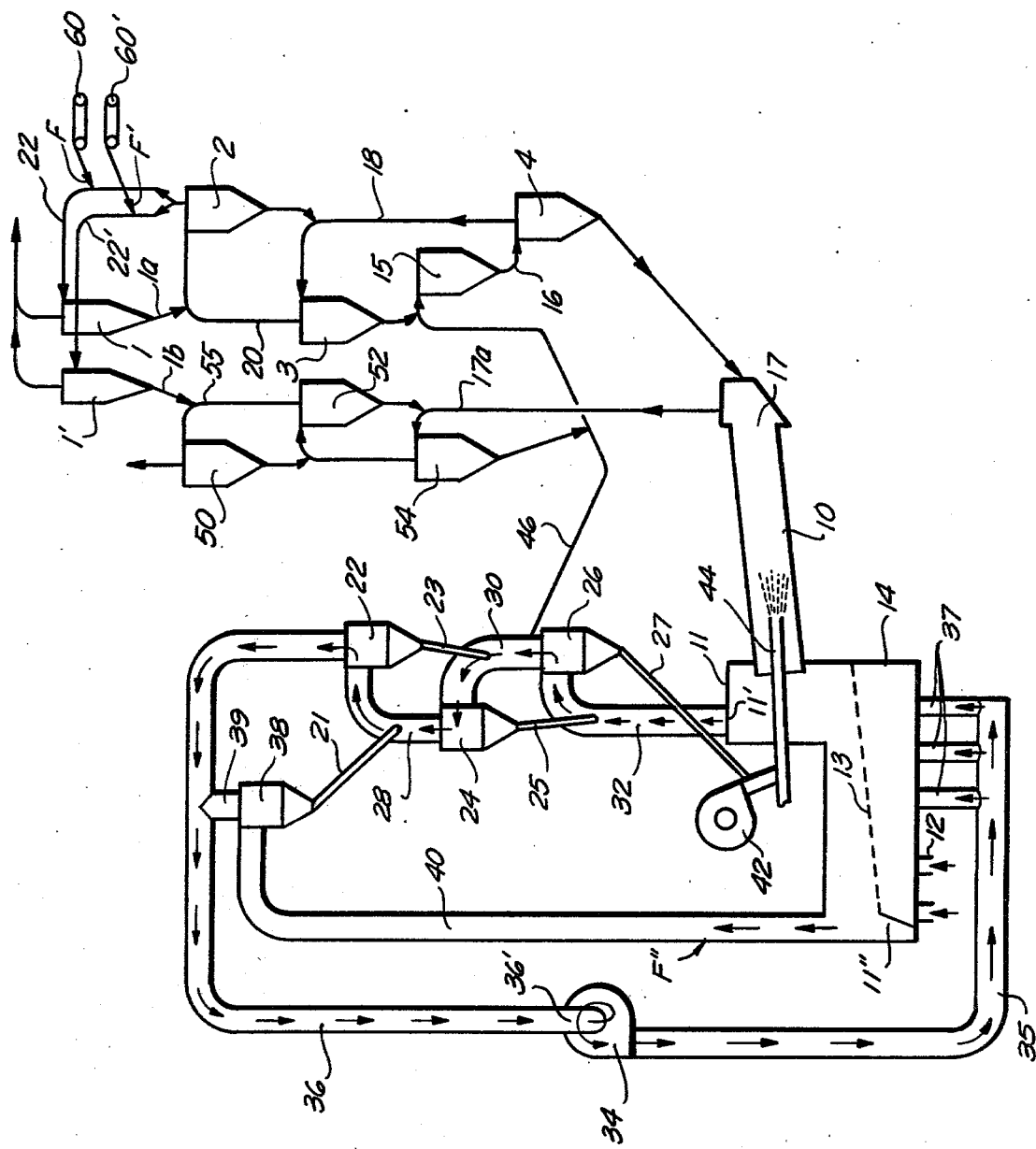

METHOD AND APPARATUS FOR REDUCING THE CALORIFIC CONSUMPTION OF A CEMENT PRODUCING PLANT

This is a continuation-in-part of my application Ser. No. 735,426, filed Oct. 26, 1976, now abandoned.

The present invention relates to a method of reducing the calorific consumption of an installation for producing cement from dry raw material in a rotary tubular kiln.

Known cement manufacturing installations include heat exchange means where the raw material is preheated by the hot gases recovered from the kiln, optionally a calcining chamber disposed upstream of the kiln in the direction of circulation of the material, and a cooling zone where the clinker product discharged from the kiln is cooled by a blast of fresh air which is then used as secondary combustion air in the kiln, and, optionally, the calcining chamber.

In present installations of this type, the amount of necessary secondary air is insufficient to assure cooling of the clinker product and it is, therefore, necessary to use excess air in the cooling zone, which is discharged to the atmosphere or recycled after it has been cooled by indirect heat exchange with cold air. To recover the calories in the excess air, it is sometimes used to dry the raw material. However, since this air is recovered from the cooling zone at a relatively low temperature of the order of 300° C., the recovered heat is small.

It has also been proposed to remove excess air from the cooling zone at a higher temperature of the order of 800° C. and to use the heat in a boiler associated with a turbo-alternator before recycling the air. This involves investment costs and relatively high maintenance expenses. Considering the relatively low heat-to-energy transformation ratio, it is not an economical procedure for producing electric energy.

It is the primary object of this invention to reduce the calorific consumption of cement production plants of the indicated type by a more efficient recovery of the heat of the clinker product.

It is another object of the invention to avoid pollution by avoiding the release of the cooling air to the atmosphere.

It is also an object of the present invention to improve the economy of the dust separation installation associated with cement production.

The above and other objects are accomplished in accordance with this invention by heating the raw material in the kiln by hot gases therein to convert the raw material into a clinker product, recovering the hot gases from the kiln, preheating a major porton of the raw material by the recovered hot gases, and introducing the preheated major raw material portion into an inlet end of the kiln for heating in the kiln. The clinker product is removed from a discharge end of the kiln and fresh air is delivered to the removed clinker product to cool the same whereby the fresh air is heated by contact with the clinker product. A portion of the heated fresh air is removed at a temperature of the order of 900° C. to 1000° C. and the removed portion of the fresh air heated to this high temperature is brought into contact with a minor fraction of the raw material whereby the heated fresh air portion is cooled in heat exchange with the minor raw material fraction and the minor raw material fraction is heated and at least partially calcined. The at least partially calcined minor raw material fraction is introduced into the kiln and at least a portion of the cooled air is delivered with the fresh air to the clinker product removed from the kiln, preferably at the discharge end where a burner feeds combustible materials to the kiln for heating the same. More particularly, this minor raw material fraction may be injected into the kiln, with the combustible materials, through a blast pipe of the burner.

The illustrated installation for producing cement comprises a rotary tubular kiln heat by hot gases for converting the raw material into a hot clinker product, the kiln having an inlet end receiving a major portion of the raw material and a discharge end for the hot clinker product, heat exchange means receiving recovered hot gases from the kiln and preheating the major raw material portion before it is received in the kiln, and a cooling means arranged adjacent the discharge end for receiving the hot clinker product from the kiln, the cooling means having means for delivering fresh air for cooling the clinker product, the fresh air being heated by heat exchange contact with the hot clinker product coming from the kiln discharge end, a first fresh air output immediately adjacent the discharge end of the kiln where the hot clinker product from the kiln first contacts the fresh air, another fresh air output receiving the fresh air at a temperature lower than that prevailing at the first fresh air output and an auxiliary air input. A gas conduit circuit has a downstream end connected to the first cooling means fresh air output and receives the heated fresh air from the initial heat exchange contact with the hot clinker in the cooling means, and an upstream end connected to the auxiliary air input of the cooling means. The gas conduit circuit includes a main heat exchange means having a gas inlet connected to the first fresh air output of the cooling means and a gas outlet, a supplementary heat exchange means having a gas inlet connected to the other fresh air output, an inlet for receiving a minor fraction of the raw material and a discharge port for the minor raw material fraction, the fresh air from the other output conveying the raw material through the supplementary heat exchange means to the discharge port while subjecting the raw material fraction to preliminary preheating, and a ventilator having an input connected to the gas outlet of the main heat exchange means and to the other fresh air output, and an output connected to the auxiliary air input of the cooling means whereby at least a fraction of the air passing through the main heat exchange means is recycled to the cooling means and the raw material fraction is conveyed to the discharge port. A conduit connects the discharge port to the kiln for delivering the raw material fraction from the heat exchange means into the kiln.

The above and other objects, advantages and feature of the present invention will become more apparent from the following detailed description of a now preferred embodiment thereof, taking in conjunction with the single feature of the accompanying drawing which schematically shows a cement production installation for practicing the method of this invention.

The type of installation described and illustrated herein comprises preheating apparatus for dry raw material, a calcination chamber for the raw material, a tubular rotary kiln for the material, and cooling apparatus for the clinker coming from the kiln. The major portion of the raw material is preheated by means of hot gases coming from the kiln and the calcination chamber before it is introduced into the kiln where it is converted into clinker. A preferred installation of the kind has been disclosed and claimed in U.S. Pat. No. 4,071,310, filed Oct. 26, 1976 and granted Jan. 31, 1978. When the present invention is not limited thereto, it is described herein in connection with preheating apparatus shown in this patent.

Referring now to the drawing, there is shown slightly inclined rotary tubular kiln 10 over whose discharge end is mounted hood 11 which also extends over cooler 14 for the clinker. The hot clinker is discharged from the kiln and is gravity-fed to grating 13 of the cooler. The grating is mounted on a casing which is connected to inlet conduits 12 delivering fresh cooling air to a relatively cool zone wherefrom the cooled clinker is discharged and wind boxes 37 receiving air from conduit 35 in a manner to be described hereinafter, the air from wind boxes 37 constituting an auxiliary air input discharging the air underneath the grating where the clinker is hottest while the fresh air from conduit 12 is blown against the clinker in a cooler zone.

While the preheating apparatus is illustrated as a series of cyclones by way of example, any suitable heat exchange means may be used for this purpose, including countercurrent heat exchange devices and the like.

A major portion of the dry raw material is preheated in a manner more fully described and illustrated in the above-mentioned patent or in any other suitable manner. For purposes of illustration and merely by way of example, this preheating apparatus is shown as a first four-stage preheater whose first stage is comprised of a pair of cyclones 1, 1' while each of the second, third and fourth stages is comprised of a single cyclone 2, 3 and 4. The flue leading from the gas outlet or second-stage cyclone 2 of the preheater has branches 22", 22' connected to the twin cyclones of the first stage. A major portion of dry raw material to be converted into clinker in kiln 10 is fed to the preheater through raw material inlets F and F' in branches 22" and 22', the amounts of raw material introduced through the inlets being controlled by dosing devices 60 and 60' so as to optimize the operation of the installation, for instance with respect to optimum drying of the raw material or maximum recovery of energy.

In case the average amounts of raw material introduced through inlets F and F' differ significantly, two cyclones 1,1' and flue branches 22", 22' must be so dimensioned that the throughput of hot gases produces optimal heat exchange with the raw material fractions introduced therein. It is also possible to dispose more than two cyclones in parallel in the first stage, for example three cyclones if the ratio between the amounts of raw material introduced at F and F' is about 1:2, the branch where the larger amount of raw material is introduced beng associated with two of the cyclones while the other branch leads to the third cyclone.

In the illustrated embodiment, combustion chamber 15 is mounted in the delivery circuit for the major portion of the raw material upstream of kiln inlet end 17 between the third and fourth stages of the preheater. A combustible material is injected into chamber 15 for producing combustion gases therein.

The four stages of the preheater are interconnected by flues, flue 16 connecting fourth-stage cyclone 4 to chamber of combustion 15 so that the hot combustion gases coming therefrom pass through the cyclones of the preheater, flue 18 leading from cyclone 4 into cyclone 3, flue 20 leading from cyclone 3 into cyclone 2, and flue branches 22", 22' leading from cyclone 2 into the twin cyclones 1, 1' of the first stage whence waste gases are exhausted by a ventilator (not shown) which sucks the combustion gases through the cyclones of the preheater.

The raw material portion fed into flues 22" and 22' is entrained by the gas flowing therethrough from cyclone 2 into first-stage cyclone 1, 1', half of the raw material portion being generally delivered into cyclone 1 while the other half is delivered into cyclone 1' where the raw material is separated from the gases. While the separated gases are exhausted from cyclones 1, 1' , the separated raw material is delivered through 1a and 1b respectively into flue 20 of the first preheater and flue 55 of a second preheater.

The second preheater of the illustrated embodiment has three stages constituted, respectively, by cyclones 50, 52 and 54. Flue 17a connects the smokestack of kiln 10 at the inlet end 17 to third-stage cyclone 54 of the second preheater so that the second preheater is fed by the hot gases recovered from kiln 10 which are sucked through the cyclones of the second preheater by a ventilator (not shown) connected to the exhaust of the first-stage cyclone 50, the hot gases flowing through the flues which interconnect the cyclones 54, 52 and 50.

The raw material passes from first-stage cyclones 1, 1' into flue 20 of the first preheater and flue 55 of the second preheater. One fraction of the raw material then passes through cyclones 2 and 3 and is delivered into a conduit 46 through which air from the cooler 14 is supplied to the combustion chamber 15, in a manner to be described hereinafter, while a second fraction of the raw material is carried by the gases flowing through flue 55 into cyclone 50 whence it passes into cyclones 52 and 54 before it is delivered into conduit 46. Thus, all of the major raw material portion fed through inlets F and F' is delivered into the combustion chamber 15 after it has passed through the second preheater heated by the hot gases from kiln 10 and the first three stages of the first preheater, and after it passes through the combustion chamber, the preheated raw material portion is delivered into fourth-stage cyclone 4 of the first preheater whence it passes into the kiln.

The preheaters for the major raw material portion delivered through inlets F and F' may, for example, be operated under the following conditions:

Temperature of the gases at the gas outlets of twin cyclones 1,1': 300° C.

Gas pressure at the outlets of these cyclones: 700 mm water below atmospheric pressure.

Temperature of the gases at the gas outlet of cyclone 50: 450° C.

Gas pressure at the outlet of this cyclone: 400 mm water below atmospheric pressure.

All of this preheater structure and operation has been fully described in the above-mentioned patent and the present invention is not concerned with the particular pre-heating structure for the major raw material portion.

In accordance with this invention, a minor fraction of the dry raw material is introduced into flue 40 at an inlet port F". This minor raw material fraction is pneumatically delivered to an inlet of cyclone 38, flue 40 and cyclone 38 constituting supplementary heat exchange means of this raw material fraction.

As has been described hereinabove, cooling means 14 arranged adjacent the discharge end for receiving the hot clinker product from kiln 10 has means 12 for delivering fresh air for cooling the clinker product, the fresh air being heated by heat exchange contact with the hot clinker product coming from the kiln discharge end. A first fresh air output 11' immediately adjacent the discharge end of the kiln is disposed to receive the fresh air in a hot zone where the hot clinker product from the kiln first contacts the fresh air and whence a portion of the fresh air is removed at a temperature of the order of 900° C. to 1000° C. Another fresh air output 11'' receives the fresh air at a temperature lower than that prevailing at first fresh output 11' in a cooler zone. Wind boxes 37 constitute an auxiliary air input for cooler 14.

A gas conduit circuit is indicated by the arrows indicating the gas flow and has a downstream end connected to first fresh air output 11' in hood 11 mounted over the discharge end of the kiln and receives the heated fresh air at a temperature of 900° C. to 1000° C. from the initial heat exchange contact with the hot clinker in cooling means 14, and an upstream end 36' connected to the auxiliary air input 37.

The gas conduit circuit includes a main heat exchange means constituted by a series of three cyclones 22, 24 and 26 where the minor fraction of raw material delivered through inlet port F'' is heated and at least partially calcined by the hot fresh air removed from cooler 14 through gas inlet flue 32 connected to first fresh air output 11', the hot air flowing from cyclone 26 through flue 30 into cyclone 24 whence it flows by flue 28 into cyclone 22 and through flue 36 to upstream gas outlet 36', the cyclones being connected in series by the flues. Ventilator 34 has an input connected to gas outlet 36' of the main heat exchange means by means of conduit 36 and the other fresh air output 11'' is also connected to gas outlet 36' by means of flue 40 leading into cyclone 38 whose outlet is connected by branch conduit 39 to conduit 36 whereby the suction pressure from ventilator 34 conveys the raw material fraction from inlet port F'' into supplementary heat exchange cyclone 38. The output of ventilator 34 is connected to wind boxes 37 by conduit 35 to complete the gas conduit circuit, so that at least a portion of the air cooled in the heat exchange means in heat exchange with the minor raw material fraction is delivered with the fresh air to the clinker product removed from the kiln. Most of the heat of the fresh air has been spent in the gas conduit circuit in heat exchange with the raw material which is at least partially calcined by the air.

The minor raw material fraction delivered through inlet port F'' is heated by the portion of the fresh air delivered through flue 40 before it is partially calcined in the main heat exchange means 22, 24, 26.

The minor fraction of dry raw material introduced into conduit 40 at F'' passes through cyclone 38 whence it is gravity-delivered through conduit 21 into flue 28 interconnecting cyclones 24 and 22. Raw material from cyclone 22 is gravity-delivered through conduit 23 into flue 30 interconnecting cyclones 26 and 24, and raw material from cyclone 24 is gravity-delivered through conduit 25 into flue 32 interconnecting hood 11 and cyclone 26. After the raw material has passed through the series of cyclones, it is gravity-delivered through conduit 27 into the output of ventilator 42 which blows this preheated raw material fraction into blast pipe 44. The blast pipe is also connected to a source of a combustible material (not shown) and injects the preheated raw material coming from cyclone 26 and the combustible material into rotary kiln 10.

Branch conduit 46 leads from flue 30 to combustion chamber 15 for feeding this chamber with secondary heating air. If desired, this secondary heating air may be removed directly from hood 11 by connecting the combustion chamber therewith, instead of flue 30.

The input of fresh air through inlets 12 of cooler 14 is in excess of the total secondary heating air consumed in kiln 10 and the combustion chamber 15.

By way of example, it is possible to heat to the temperature of decarbonization and at least partially calcine 10% of the total throughput of the treated raw material in the installation of the present invention by means of air removed from the hood over the kiln discharge end at a temperature of about 900° C. to 1000° C., the air coming from cyclones 22 and 38 being recycled by ventilator 34 to the cooler grating at a temperature of about 300° C. The heat efficiency of such an installation with respect to a conventional installation is increased by more than 8%.

What is claimed is:

1. A method of reducing the calorific consumption of an installation for producing cement from dry raw material in a rotary tubular kiln, comprising the steps of
   (a) heating the raw material in the kiln by hot gases therein to convert the raw material in to a clinker product,
   (b) recovering the hot gases from the kiln,
   (c) preheating a major portion of the raw material by the recovered hot gases,
   (d) introducing the preheated major raw material portion into an inlet end of the kiln for heating in the kiln,
   (e) removing the clinker product from a discharge end of the kiln,
   (f) delivering fresh air to the removed clinker product to cool the same whereby the fresh air is heated by contact with the clinker product,
   (g) removing a portion of the heated fresh air at a temperature of the order of 900° C. to 1000° C.
   (h) bringing the removed portion of the fresh air heated to said temperature into contact with a minor fraction of the raw material whereby said heated fresh air portion is cooled in heat exchange with the minor raw material fraction and the minor raw material fraction is heated and at least partially calcined,
   (i) introducing the at least partially calcined minor raw material fraction into the kiln, and
   (j) delivering at least a portion of said cooled air with the fresh air to the clinker product removed from the kiln.

2. The method of claim 1, comprising the further step of heating the minor raw material fraction before it has been at least partially calcined with another portion of the fresh air heated by contact with the clinker product but having a temperature lower than that of the portion of the heated fresh air with which the raw material fraction is at least partially calcined.

3. The method of claim 1 or 2, wherein the at least partially calcined raw material fraction is injected into the discharge end of the kiln.

* * * * *